UNITED STATES PATENT OFFICE.

KARL BURKHEISER, OF HAMBURG, GERMANY.

PROCESS OF RECOVERING SULFUR FROM GAS.

1,018,479.　Specification of Letters Patent.　Patented Feb. 27, 1912.

No Drawing.　Application filed July 26, 1910.　Serial No. 573,928.

*To all whom it may concern:*

Be it known that I, KARL BURKHEISER, a subject of the German Emperor, and resident of Hamburg, Germany, have invented certain new and useful Improvements in Processes of Recovering Sulfur from Gas, of which the following is a specification.

In the process of separating sulfureted hydrogen from gases by passing it over a mass, which is adapted to give off oxygen, it is known that bog-iron ore, and analogous, artificially prepared compounds of iron and oxygen, may not only be used in a moist state, but also when baked, *i. e.* after the expulsion of the water. It has however been ascertained that a mass freed from water by heating, only possesses adequate reactivity when maintained at red heat during the passage of the gases. This high temperature is objectionable as it destroys the valuable by-products contained in the gases. In general therefore, the practice has been to use the purifying mass in a moist state, which allows the process to be carried out at ordinary temperature. If the mass does not originally contain organic matter, saw-dust may be added thereto for loosening and moisture-retaining purposes. The absorbing capacity of such moist masses is however so slight, that a large amount of space is required, and that the gas should flow but very slow, thus necessitating an apparatus of considerable dimensions.

The present invention is based on the fact that there is an intermediate stage of maximum absorbing capacity between the state of normal hydrated iron oxid, capable of acting as a purifier in a cold but moist condition, and the state of iron oxid obtained by expulsion of water from the hydrate, capable of acting in a dry state only when heated; at said intermediate stage the mass being entirely free from moisture, with reaction at ordinary temperatures. This intermediate stage is represented by that modification of hydrated iron oxid, which is produced by gradual expulsion of the moisture and of part of the chemically bound water, until the mass is neither hydrate nor oxid but a partially hydrated ferric oxid. The hydrated iron oxid undergoes several changes sharply distinguished from each other by the coloring of the mass. The moist bog-iron ore heretofore used for the sulfur-purification is brown; when dried at 95 or 100 C. the color is changed to ocher. After partial expulsion of the chemically bound water a dark red coloring occurs, differing from the light red or yellow-red of the oxid from which water has been wholly expelled. The dark red coloring occurs when the mass is exposed for some time to temperatures varying approximately between 100 and 200 C; a higher temperature is not injurious if the period of exposure is correspondingly shortened. It is this red hydrate which possesses an extremely high capacity of absorbing sulfureted hydrogen, the capacity being treble that of the moist hydrate, and the time of absorption being considerably increased.

The prepared partially hydrated ferric oxid, obtained by carefully regulated heating of bog iron ore or a similar, artificially prepared mass, is preferably used in a granular state; if it is in the form of powder, agglomeration to a coarser granular state may be effected by adding a binding agent such as cement. By virtue of its nature and qualities, the prepared mass requires no loosening admixture, and in view of its dryness, there is no danger of "caking" and baking the mass to solid lumps. The large active surface afforded by the fine distribution and porosity is not counteracted by water, to be rendered partly ineffective. The rate of flow of the gas through the mass, hitherto usually 7 mm., may be increased to 200 mm., so that the dimensions of the purifying plant are greatly reduced.

Inasmuch as the gases flowing through the purifying mass always contain water vapor, and as additional water is produced by the reaction binding the sulfureted hydrogen according to the following formula:

$$Fe_2O_3 + 3H_2S \rightleftarrows Fe_2S_3 + 3H_2O$$

there is some danger of depositing water on the mass, thereby chemically modifying the same, and diminishing the active surface. To allow the carrying out of the process at temperatures below 100 centigrade, as is most desirable, the gases are maintained in a superheated state during their passage over the mass, that is to say, they are maintained in a state in which they tend to absorb water. For this purpose, the gases may be cooled before entering the purifier, and then reheated, or they are cooled as far as possible below the temperature at which the conversion is to take place in the purifier, and the restoration of heat is made by heating the purifier.

The regeneration of the mass which preferably takes place at temperatures between a bright red heat and about 200° C. may be effected in the simplest manner without removing it from the purifier, by passing air (oxygen) through the latter. It has been found that the considerable heat of reaction produced by the oxidation of the sulfur in the interior of the mass, more particularly with a rapid flow of the air, readily produces temperatures up to bright red heat. The red hydrate of iron oxid is of course converted into iron oxid, by separation of the residual chemically bound water, so that the mass becomes unsuitable for the use in the manner described. This burning "dead" of the mass during regeneration can be prevented by providing for a continuous, regular withdrawal of heat from the interior of the mass. This can be done by so dimensioning the purifying box, that its surface is comparatively large when compared with the contents, that is to say by using high, narrow boxes; or cooling ribs or cooling pipes may be arranged to traverse the mass. In this manner the mass is prevented from becoming overheated, and the full absorbing capacity thereof is restored.

The sulfurous acid produced by the oxidation may be separately utilized, for example for binding the ammonia in the gas. If the mass regenerated as described contains sulfate of iron, sulfite of iron, free acid and ammonium sulfite and sulfate (due to the presence of ammonia in the gas), these substances must be separated in the course of regeneration, inasmuch as they greatly reduce the effective active area of the mass. It is therefore, desirable to wash or lixiviate the mass, preferably with water or ammonia water, and then to dry it.

In itself it appears immaterial, in regard to the regeneration, whether the air current flows upward, downward or transversely through the mass, but in practice it has been found that an upward flow is to be preferred. In the case of a downward flow, first adopted for simplicity, it was discovered that melted sulfur accumulated at the bottom of the purifier, and was thus withdrawn from the oxidizing process. This separation of free sulfur may be explained as follows:— At the place where the air enters the purifying mass the oxidation of the sulfur is of course the most energetic by reason of the excess of oxygen here present. The zone of oxidation is gradually extended through the purifier, in the direction of the flow of air, accompanied by a corresponding increase of temperature. A zone of somewhat lower temperature advances in front of the oxidizing zone, this lower temperature being insufficient for complete oxidation, but capable of melting the sulfur in the mass. If the air is flowing downward the melted sulfur drips down and flows away, this sulfur being liable to clog the pipes. But if the air is flowing upward the melting zone is above the oxidizing zone; the melted sulfur trickles into the oxidizing zone, and is completely oxidized. This entirely obviates loss in cases in which the sulfurous acid from the purifier is utilized.

A special method of preparing the red ferric hydrate from natural bog-iron ore in the first instance consists in utilizing the peaty mass contained in the bog-iron ore for supplying the necessary heat, so that after once starting the process the conversion readily continues. For this purpose a furnace is filled with lumps of bog-iron ore, whereupon a small fire is started at the bottom of the furnace. The peaty mass is thus ignited and the glowing zone gradually spreads through the entire charge, thereby expelling the moisture and also separating part of the chemically bound water. If, as in the case of the regenerating process described, care is taken to maintain the temperature below bright red heat, the final product is the desired red ferric hydrate, which can be removed at the bottom, while a fresh charge is introduced at the top. The operation is thus rendered continuous.

I claim:

1. Process of recovering sulfur from gas, which consists in heating a mass of hydrated iron oxid to a temperature sufficient only to produce the red hydrate modification thereof, and passing the gases containing sulfureted hydrogen over said modified mass at ordinary temperatures.

2. Process of recovering sulfur from gas, which consists in heating hydrated iron oxid to a temperature sufficient only to produce the red hydrate modification thereof, passing the gases containing sulfureted hydrogen over said modified mass at ordinary temperatures, passing oxygen through said mass alternately with said gases, and withdrawing the heat of reaction produced during the passage of the oxygen.

3. Process of recovering sulfur from gas, which consists in heating hydrated iron oxid to a temperature sufficient only to produce the red hydrate modification thereof, passing the gases containing sulfureted hydrogen over said modified mass at ordinary temperatures, passing oxygen through the mass alternately with said gases, withdrawing the heat of reaction produced during the passage of the oxygen through said mass, lixiviating the mass and reheating the same.

4. Process of recovering sulfur from gas, which consists in heating hydrated iron oxid to a temperature sufficient only to produce the red hydrate modification thereof, passing the gases containing sulfureted hydrogen over said modified mass, passing oxygen through said mass in an upward direction, alternately with said gases and withdrawing the heat of reaction produced during the passage of the oxygen.

5. Process of recovering sulfur from gas which consists in heating bog-iron ore by igniting the peaty matter therein with a limited air supply to produce the red hydrate modification thereof, and passing the gases containing sulfureted hydrogen over said modified mass at ordinary temperatures.

6. Process of recovering sulfur from gas which consists in heating a mass of hydrated iron oxid to a temperature sufficient only to produce the red hydrate modification thereof, and passing the gases containing sulfureted hydrogen over said modified mass at ordinary temperatures, said gases being previously cooled below the point of water saturation.

In testimony, that I claim the foregoing as my invention I have signed my name in presence of two subscribing witnesses.

KARL BURKHEISER.

Witnesses:
GEORG PINKEN,
GEORG BORDERVIECK.